United States Patent
Lee, Sr.

[15] 3,669,006
[45] June 13, 1972

[54] APPLIANCE FOR AND METHOD OF PASTRY MAKING

[72] Inventor: Maurice Wm. Lee, Sr., P.O. Box 25, Boley, Okla. 74829

[22] Filed: Oct. 23, 1970

[21] Appl. No.: 83,549

[52] U.S. Cl..............................99/450.3, 99/376, 99/380, 425/109, 425/298
[51] Int. Cl..........................................A21c 11/00
[58] Field of Search ..............107/15 B, 15 R, 15 AE, 3, 1 A, 107/16, 1 E, 17, 54 R, 54 B, 18, 58, 54 D; 18/16, 16 E, 16 R, 16 T, 30, 35, 36, 39, 43; 25/45, 46, 41; 31/35, 36, 40; 99/376, 383, 393, 372, 375, 369, 378–382, 367

[56] References Cited

UNITED STATES PATENTS

| | | | |
|---|---|---|---|
| 1,587,788 | 6/1926 | Morley | 99/376 |
| 1,959,011 | 5/1934 | Trompelter | 107/1 E |
| 2,232,633 | 2/1941 | Richardson | 107/15 B |
| 2,249,667 | 7/1941 | Richardson | 107/15 B |
| 2,896,555 | 7/1959 | Marcus et al. | 107/15 B |
| 2,138,297 | 11/1938 | Tatosiah | 107/58 |

Primary Examiner—Jordan Franklin
Assistant Examiner—Geo. V. Larkin
Attorney—Robert K. Rhea

[57] ABSTRACT

A hot plate type base, having a hingedly connected lid-like top frame or cover, is provided with pie dough and pie filling receptacles on the upper surface of the base. Heated plates, pivotally mounted by the top, are respectively provided with pie dough edge trimming and crimping dies and pie dough shaping dies in registering relation with respect to the receptacles on the base. The device forms a grill when the receptacles and dies are removed from the base and cover.

4 Claims, 7 Drawing Figures

PATENTED JUN 13 1972 3,669,006

MAURICE WM. LEE, SR
INVENTOR.

BY Robert K. Rhea
AGENT

MAURICE WM. LEE, SR.
INVENTOR.

BY
Robert K. Rhea
AGENT

APPLIANCE FOR AND METHOD OF PASTRY MAKING

BACKGROUND OF THE INVENTION

1. Field of the Invention

The present invention relates to pastry cooking and more particularly to a device for shaping pie dough and baking pies.

This application is a substitute of an application, Ser. No. 422,889 filed by me Jan. 4, 1965 for Apparatus For And Method Of Pastry Making, now abandoned.

The necessary steps of making pies is ordinarily a time consuming operation. The previously mixed pie dough is usually rolled out to form a sheet having a desired thickness which is placed over a pie plate and trimmed and thereafter baked or partially baked to form the bottom crust of a pie. The pie filling is then added and a second sheet of pie dough is laid over the filling prior to the baking of the filling and top crust when making a two crust pie.

This invention provides a hot plate type base portion having one or more receptacles for receiving a quantity of pie dough. A top or cover, hingedly connected with the base, is provided with dies registering with the receptacles for forming and baking the pie dough and pie filling.

2. Description of the Prior Art

The most pertinent prior U.S. Pats. are Nos. 1,374,522; 1,587,788; 1,874,836; 1,959,011; 1,977,084 and 2,138,247. These patents generally disclose pie crust and pie baking devices, some of which have receptacles for cooperatively receiving the pie dough and filling. U.S. Pat. No. 1,977,084 discloses baking the pie crust by applying heat to both sides thereof.

However, none of these patents disclose pie dough forming and trimming dies reversibly mounted on a hinged cover or lid movable toward and away from a pie crust receiving receptacle.

SUMMARY OF THE INVENTION

Generally this device comprises a rectangular base horizontally supporting a removable electrically heated plate having one or more concave pie receptacles on its upper surface. A lid-like top frame or cover member, hingedly supported by the base for movement toward and away from the heated base plate, is provided with a heated plate, having one or more pie forming convex dies attached to one surface and one or more pie dough trimming and pie filling baking dies attached to its other surface, rotatably mounted by the top frame for registration of the respective dies with the receptacles on the heated base plate. Pie dough is placed within the pie receiving receptacles and formed, trimmed and baked by the dies on the cover when placed in contact with the pie dough in the receptacle. Similarly pie filling and pie top crust is sealed with the bottom crust and baked with the pie filling by the electrically heated cover plate and dies.

Generally the improved process includes the following steps:

I—Heating the base receptacles and cover dies to a desired temperature.

II—Placing an unformed measured amount of relatively stiff pastry dough in the base receptacles.

III—Lowering the cover to parallel position with respect to the plane of the pie dough receptacles to form and bake a pastry shell.

IV—Lifting the cover and spreading a measured quantity of pie filling within the baked pastry shell.

V—Placing a pie dough top or cover on said pie filling.

VI—Reversing the position of the cover dies and lowering the cover to a parallel position with respect to the plane of the pie receptacles to seal and trim the peripheral edge portion of the pie dough top with the peripheral edge portion of the pastry shell while baking the pie dough and filling until the pie dough is browned.

VII—Raising the cover to an open position and removing the pie.

For baking open face pies steps I through IV are followed and the pie is removed from its receptacle when using precooked pie filling. When using uncooked or partially cooked filling the cover is lowered to a closed position where it remains during the desired cooking time.

The principal objects of this invention are to provide an apparatus and method for forming the baking pie dough and fillings, having pie dough and filling receiving receptacles registering with cooperating dies for marking pie top crusts of two crust pies and baking open faced pies which materially reduces the amount of time and labor normally required and wherein the device is easily maintained in a sanitary condition by ease of removal of pie receiving receptacles and registering dies wherein the device may also be used as a grill when the pie receptacles and cover dies are removed.

DESCRIPTION OF THE PREFERRED EMBODIMENT

Figure 7:
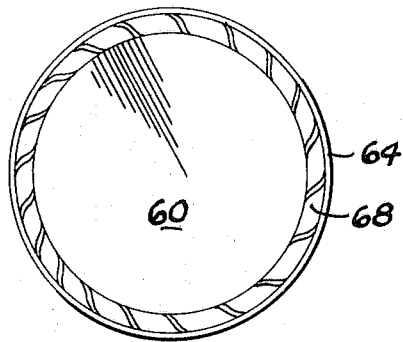

Like characters of reference designate like parts in those figures of the drawings in which they occur.

Figure 3:
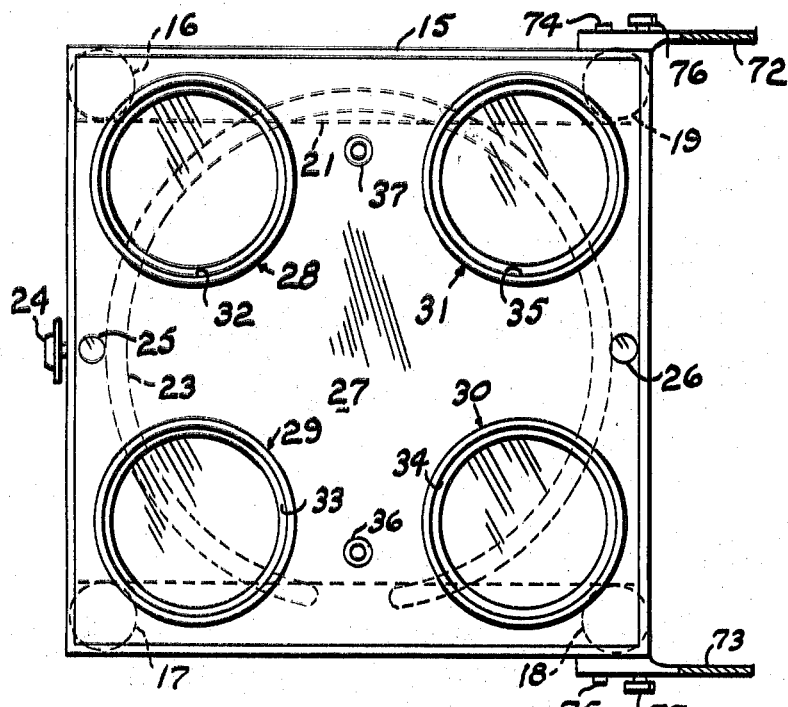
FIG. 3 is a plan view, partially in section, of the base portion of the device taken substantially along the line 3—3 of FIG. 1.
Figure 4:
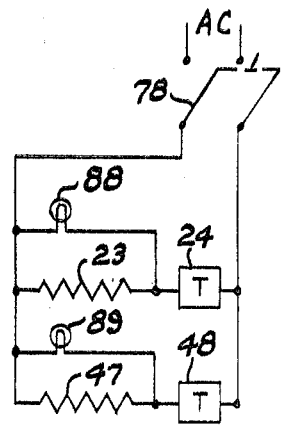
FIG. 4 is an electrical wiring diagram.

In the drawings:

The appliance includes a base 10, preferably square or rectangular, having vertical walls 12, 13, 14 and 15 supported by plastic knobs or feet 16, 17, 18 and 19. The inside surfaces of the walls 12, 13, 14 and 15 are rabbetted at their respective upper extremity and have ribs 20 and 21 (FIG. 3) extending from wall 12 to wall 14 to receive and support a plate-like unit 22, which has a heating element 23 mounted therein. Heating element 23 is controlled by a thermostat 24 mounted on the front wall 12. Removably mounted on the top surface of the unit 22 by thumb screws 25 and 26 (FIG. 3) is a die support plate 27 preferably having a plurality, four in the example shown, of circular concave dies or receptacles 28, 29, 30 and 31, each characterized by an annular upstanding wall 32, 33, 34 and 35, respectively. The inner surfaces of these annular walls 32, 33, 34 and 35 extend angularly inward and downward toward the plane of the surface of the plate 27 to form the concave receptacles. The general shape of the receptacles 28, 29, 30 and 31 may, of course, be of any polygonal configuration desired. Base support plate 27 has two or more conical-shaped male guide pins 36 and 37 to mate with cooperating female sockets 38 formed on a plate 40 detachably mounted on a top or cover support 41 by means of thumb screws, not shown.

The top plate support or unit 41 is rotatably mounted on tubular trunnions 43 and 44 extending, respectively, through suitable holes formed in a pair of spaced-apart arms 45 and 46 forming a portion of a hinged top or cover 51. The arms 45 and 46 are pivotally mounted by pins 71 secured to brackets 72 and 73, which in turn are pivotally mounted on opposite walls, 13 and 15, of the base 10 by shoulder screws 74 and 75 and fixed in a selective position by knobs 76 and 77, inserted through mating holes formed in the base and brackets for the reason presently described.

Figure 5:
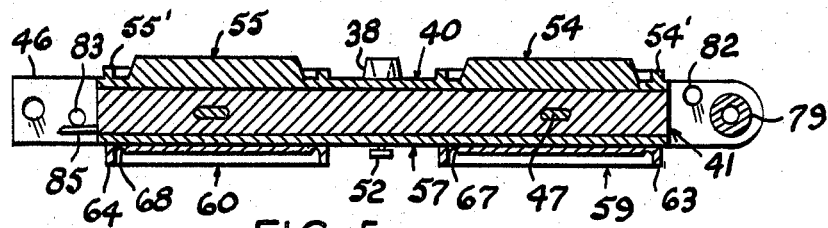
FIG. 5 is a vertical cross-sectional view of the cover taken substantially along the line 5—5 of FIG. 2 and inverted.
Figure 6:
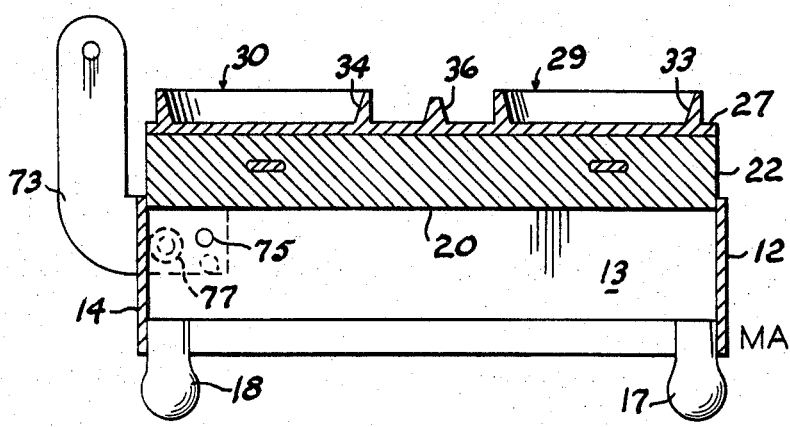
FIG. 6 is a vertical cross-sectional view of the base portion taken substantially along the line 6—6 of FIG. 2; and, FIG. 7 is a plan view of a typical die, per se, for forming and trimming pie top crust.

The support plate 41 contains a heating element 47 (FIG. 5). Heating element 47 is controlled by a thermostat 48 mounted on the front of the support 41. Flexible cables or conductors 49 and 50, connected with the heating element 47 and the thermostat 48, are passed through the trunnions 43 and 44. One two-wire flexible cable, not shown, may be used instead of two cables and passed through one trunnion only if desired.

The interior of base 10 also serves as a junction box for all electrical connections, and the cables 49 and 50 pass through suitable holes formed in the base walls to facilitate electrical connections. The plate 40 is provided with four convex dies, only three being shown, 53, 54 and 55 which are inversely similar to the concave receptacles 28, 29, 30 and 31 and have their surfaces disposed in spaced relation with respect to the inner surfaces of the concave receptacles when the upper plate support 41 is in closed position and parallel with the unit 22. The convex dies 53, 54 and 55 are further characterized by surrounding annular shoulders or dough trimming rims 53', 54' and 55', respectively, spaced outwardly of the peripheral limit of the convex die configuration a distance sufficient to dispose the inner surface or periphery of the respective rim in close spaced relation with respect to the periphery of the respective receptacle with which it registers or mates as hereinafter explained. These rims 53', 54' and 55' project away from the plane of the plate 40 a distance substantially less than the depth of the respective convex die 53, 54 and 55.

Mounted on the other or opposite surface of the plate support 41 by means of thumb screws 52 is a detachable plate 57 having on its outer surface four shallow circular generally flat dies, only three being shown, 58, 59 and 60 defined by outward annular rings 62, 63 and 64, respectively, whose inside diameter is slightly greater than the outside diameter of the receptacle walls 32, 33, 34 and 35 and serve as cutting dies to trim pie crust. Adjacent the inside edge of the annular rings 62, 63 and 64 are serrated annular concave channels 66, 67 and 68, respectively, which serve to form a decorative edge on the top pie crust. The serrations or convolutions may be of any desired decorative configuration.

Figure 1:
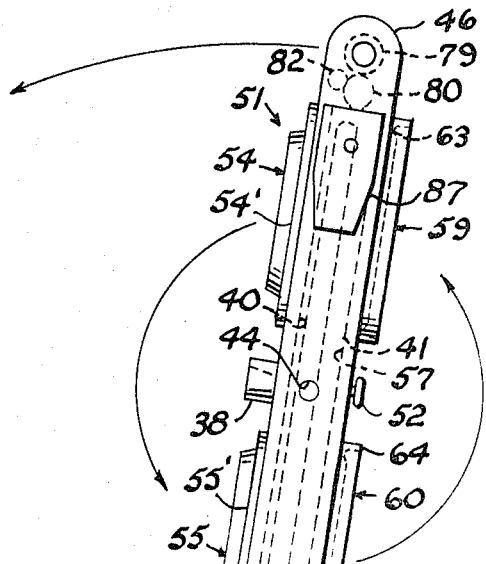
FIG. 1 is a side elevational view of the device with the cover in open position and illustrating, by dotted lines, the cover in closed and grill forming positions.
Figure 1:
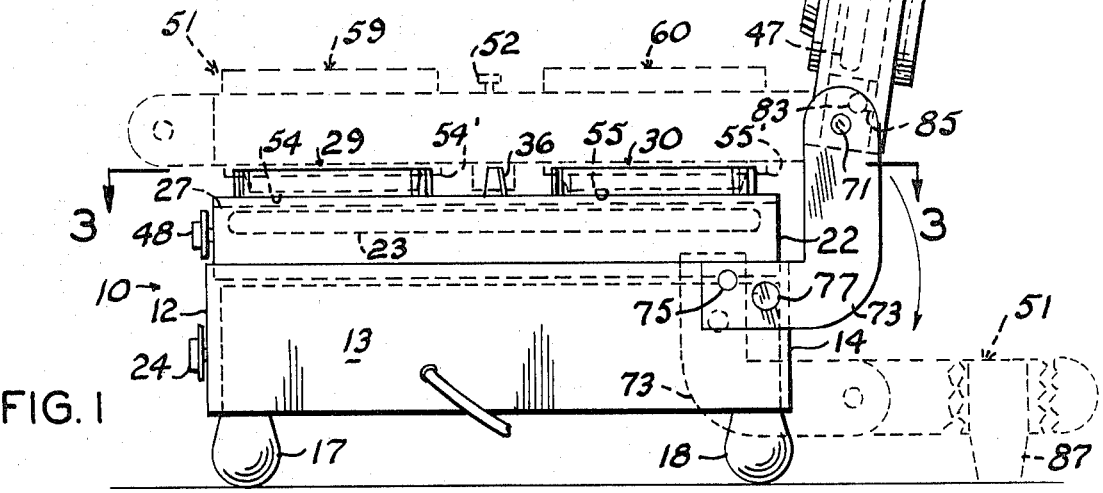

When in normal position for cooking pastries the cover support brackets 72 and 73 are in the position shown by solid lines (FIG. 1). When the support 41 is pivoted outwardly to a horizontal position with its free end portion opposite the unit 22, as shown by dotted lines (FIG. 1), the plates 27 and 40 are removed so that the flat surfaces of the units 22 and 41 may each serve as a grill.

A switch 78 is mounted on the front wall 12 of the base 10 for connecting a source of electrical energy with both heating elements 23 and 47.

Figure 2:
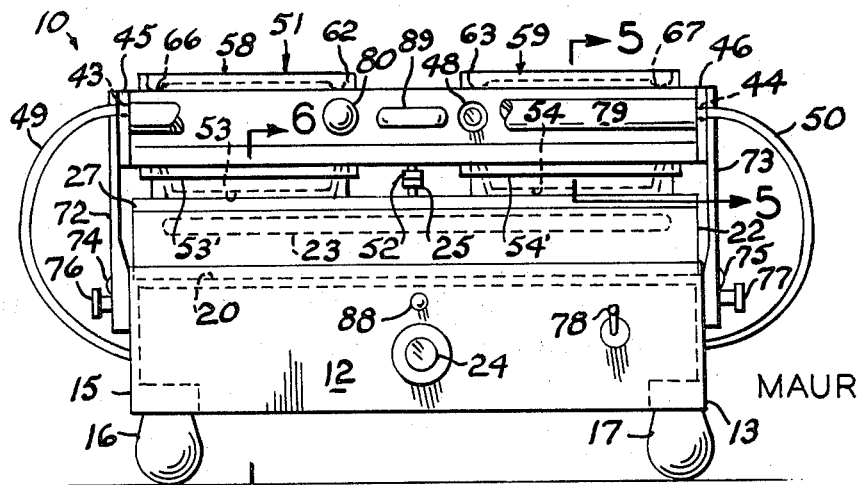
FIG. 2 is a front elevational view of the device with the cover in closed position and having a portion broken away for clarity.

A handle 79 extends between the free ends of the arms 45 and 46 to facilitate raising and lowering the cover 51. On the forward and rear ends of the support 41 are heat resistant plastic handles or control knobs 80, only one being shown (FIGS. 1 and 2) to facilitate rotation or reversal of the support 41 in the direction of the arrows. On the inner side of arms 45 and 46 are stops 82 and 83 (FIGS. 1 and 5) which cooperate with detent pins 85 on one end edge of the support 41, and serve to stop the rotation of the support 41 in the plane of the arms 45 and 46. Adjacent both ends of the handle 79 and on the outside of arms 45 and 46 are legs 87 which are pivotally movable in a downward direction, as shown by dotted lines (FIG. 1), and serve to support the cover 51 when it is pivoted outwardly on the pins 71 to a horizontal position parallel with respect to the unit 22 to serve as a grill. Also mounted on the base front wall 12 and front of the support 41 are pilot lights 88 and 89 which are respectively connected in parallel with the heating elements 23 and 47 and serve to indicate when these elements are in operation and a desired heat has been attained.

OPERATION

In operation the switch 78 is turned on permitting the electrical current to energize the heating elements 23 and 47 and heat the plates 30, 40 and 57 and their respective receptacles and dies to a desired temperature, approximately 425°, controlled by the respective thermostats 24 and 48. A measured quantity of relatively stiff pie dough, not shown, is placed in the respective pie dough receiving receptacles 28, 29, 30 and 31 and the cover 51, having the pie dough forming convex dies 53, 54 and 55 disposed in downward receptacle registering position, is pivoted toward the base which distributes and spreads the pie dough throughout the area or spacing between these dies and the respective receptacles to shape and trim the pie dough and form a pastry shell. The pie dough is baked a short time, approximately 60 seconds, and the cover 51 is then lifted. Pie filling and top crust, neither of which are shown, are placed respectively within and on the pastry shells and the cover support 41 has its position reversed by pivoting it about its trunnion mountings 43 and 44 so that the dies 58, 59 and 60 are disposed in depending relation for overlying the pie receptacles when the cover 51 is pivoted to closed position. The annular rings 62, 63 and 64, respectively registering with the pie receptacle walls, form cutting dies to trim the top pie crust and crimp it with the pastry shell periphery. The cover 51 remains in closed position a desired length of time to cook the pie filling and pie dough top a length of time, approximately 2 minutes, or until the pie top is browned. Thereafter, the current is interrupted by opening the switch 78 and the baked pies removed from the receptacles. In the event open face pies are being cooked, the cover dies 58, 59 and 60 do not perform a dough cutting action but remain in spaced relation with respect to the pie receptacles during the cooking time which is accomplished by the guide pins 36 and 37 entering and supporting the top by means of the sockets 38 and 39. In the event a meringue forms the top of the pies being baked the die supporting plate 40 is removed from the support 41 so that the flat surface of the support 41 may be positioned in similar spaced relation above the meringue and remain there by means of the guide pins until the baking is complete and the meringue has its top surface slightly browned.

Obviously the invention is susceptible to changes or alterations without defeating its practicability, therefore, I do not wish to be confined to the preferred embodiment shown in the drawings and described herein.

I claim.

1. A machine for making pies and pastries, comprising:
   a base having vertical side walls;
   ribs extending between opposing side walls of said base adjacent their upper limit;
   flat base plate means including a heating element horizontally supported by said ribs;
   at least one concave receptacle on the upper surface of said flat base plate means;
   a pair of arms pivotally connected at one end portion, respectively, to opposite side walls of said base for movement of their other end portions toward and away from said base plate means;
   reversible plate means including opposing flat faces and a heating element interposed between said arms;
   a trunnion extending through each said arm, intermediate its ends, and connected with said reversible plate means for vertical pivoting movement of the latter about a horizontal axis; and,
   dies mounted opposite each other on the respective flat faces of said reversible plate means for respectively registering with said receptacle.

2. A machine as described in claim 1 and further including:
   a detent pin secured to said reversible plate means; and,
   detent stops mounted on said arms and respectively engaged by said detent pin for maintaining said reversible plate means in the plane of said arms.

3. A machine as described in claim 1 and further including:
   heat resistant handle means mounted on said reversible plate means; and,
   cooperating guide support means secured respectively to said flat base plate means and said reversible plate means for maintaining said reversible plate means in parallel spaced relation with respect to said flat base plate means when the respective said die is in register with said receptacle.

4. A machine as described in claim 3 and further including:
a leg pivotally mounted on the free end portion of each said arm for supporting said reversible plate means in parallelism with the plane of said flat base plate means when said arms are pivoted away from the plane of said flat base plate means through an arc of 180°.

* * * * *